(12) United States Patent
Li et al.

(10) Patent No.: US 11,988,655 B2
(45) Date of Patent: May 21, 2024

(54) COMBINED PLATFORM FOR TESTING FIREPROOF MATERIALS FOR CABLES

(71) Applicant: STATE GRID JJIANGSU ELECTRIC POWER COMPANY RESEARCH INSTITUTE, Jiangsu (CN)

(72) Inventors: Chenying Li, Nanjing (CN); Jie Chen, Nanjing (CN); Xiao Tan, Nanjing (CN); Yijun Fei, Nanjing (CN); Wei Zhang, Nanjing (CN); Jingying Cao, Nanjing (CN); Yang Liu, Nanjing (CN); Qiang Wu, Nanjing (CN); Jinggang Yang, Nanjing (CN); Qiang Huang, Nanjing (CN); Rong Sun, Nanjing (CN); Jian Liu, Nanjing (CN); Hongze Li, Nanjing (CN); Liguo Liu, Nanjing (CN)

(73) Assignee: STATE GRID JIANGSU ELECTRIC POWER COMPANY RESEARCH INSTITUTE, Nanjing (CN)

(*) Notice: Subject to any disclaimer, the term of this patent is extended or adjusted under 35 U.S.C. 154(b) by 87 days.

(21) Appl. No.: 17/792,134

(22) PCT Filed: May 19, 2021

(86) PCT No.: PCT/CN2021/094576
§ 371 (c)(1),
(2) Date: Jul. 11, 2022

(87) PCT Pub. No.: WO2022/062434
PCT Pub. Date: Mar. 31, 2022

(65) Prior Publication Data
US 2023/0044933 A1    Feb. 9, 2023

(30) Foreign Application Priority Data

Sep. 23, 2020 (CN) .......................... 202011009288.0

(51) Int. Cl.
*G01N 31/12* (2006.01)

(52) U.S. Cl.
CPC .................................. *G01N 31/12* (2013.01)

(58) Field of Classification Search
CPC ...... G01N 21/12; G01N 17/002; G01N 17/00; G01N 3/60; G01N 2203/0226
(Continued)

(56) References Cited

FOREIGN PATENT DOCUMENTS

| CN | 102466585 A | 5/2012 |
|---|---|---|
| CN | 103645426 A | 3/2014 |

(Continued)

*Primary Examiner* — Daniel S Larkin
*Assistant Examiner* — Nashmiya S Fayyaz
(74) *Attorney, Agent, or Firm* — SZDC Law PC

(57) ABSTRACT

A combined platform for testing fireproof materials for cables includes a main frame for providing operating space; an air circulation system including a fresh air supply unit for supplying fresh air into the operating space and an exhaust gas treatment unit for treating the gas in the operating space under set conditions; an open flame system for providing an open flame for testing cables; a water circulation system for supplying water at least to the exhaust gas treatment unit and the operating space; and a control system for collecting at least the temperature and gas concentration in the operating space, and performing process control based on the collected results. The actual working conditions of scenarios such as fire-resistant cable tunnels and fire-resistant cable trenches can be simulated, and multiple tests such as combustion performance test and physical and chemical performance test can be carried out under various working conditions.

7 Claims, 9 Drawing Sheets

(58) Field of Classification Search
USPC .......................................... 73/865.6; 374/12
See application file for complete search history.

(56) References Cited

FOREIGN PATENT DOCUMENTS

| | | | | |
|---|---|---|---|---|
| CN | 203756279 U | 8/2014 | | |
| CN | 205157513 U | 4/2016 | | |
| CN | 205301266 U | 6/2016 | | |
| CN | 206557176 U | 10/2017 | | |
| CN | 206832774 U | 1/2018 | | |
| CN | 109260916 A | 1/2019 | | |
| CN | 109324149 A | 2/2019 | | |
| CN | 209034112 U | 6/2019 | | |
| CN | 209247718 U | 8/2019 | | |
| CN | 111929404 A | 11/2020 | | |
| JP | H08243338 A | 9/1996 | | |
| JP | 2020139903 A | 9/2020 | | |
| KR | 20140110513 A | * 9/2014 | ............ | B01D 35/06 |
| WO | 2011116174 A1 | 9/2011 | | |

* cited by examiner

COMBINED PLATFORM FOR TESTING FIREPROOF MATERIALS FOR CABLES

This application is the National Stage Application of PCT/CN2021/094576, filed on May 19, 2021, which claims priority to Chinese Patent Application No. 202011009288.0, filed on Sep. 23, 2020, which is incorporated by reference for all purposes as if fully set forth herein.

TECHNICAL FIELD

The present invention relates to a combined platform for testing fireproof materials for cables.

BACKGROUND

As an important part of urban transmission and distribution network, the importance of power cable lines is increasingly prominent. Especially in first-tier big cities such as Beijing, Shanghai, Shenzhen and Guangzhou, the cable utilization rate of their transmission and distribution networks is increasing year by year. Due to the concealment of cable engineering, the cable lines not only provide convenience and beauty to the life of urban residents, but also bring some difficulties to their operation and maintenance. However, once the cable fire occurs due to insulation aging, overload, poor contact, external damage and the like, it will cause transmission and distribution line failure, or even casualties, large area blackout in urban areas, seriously threatening the safety of the power grid and the normal power supply of the community. As the cable channel environment is relatively closed, the fire risk increases gradually with the years of operation, and firefighting measures are relatively limited. Especially in recent years, a large number of distribution cables, subscriber cables have entered the transmission cable channels, and during the design and construction of the urban comprehensive pipe gallery, gas and heat pipes are introduced near the cable silo, which have put forward higher requirements for the fire protection of the cable lines.

At present, fire protection measures such as flame retardant cables, fire doors, fire retardant coatings, flame retardant tapes, and fixed dry powder fire extinguishing devices are mainly used for the fire protection of cable lines and channels. There are various types of equipment and methods for testing of fire protection materials, while there is a lack of simulation-type cable channel scene-based performance evaluation technology. The evaluation effect of existing fire simulation evaluation scenarios such as oil pot fire and wood stack fire matches the actual application scenarios in a low degree and the evaluation effect is weak. Fire protection materials testing involves processes such as flame combustion, product pyrolysis and the like, which are likely to cause heat build-up and violent smoke generation in the test environment, and it is difficult for the hardware equipment of conventional laboratories to meet the test environment requirements.

In view of the above problems, the designer actively researches and innovates based on years of practical experience and professional knowledge in engineering applications of such products, and with the application of theories, in order to create a combined platform for testing fireproof materials for cables, making it more practical.

SUMMARY

The present invention solves problems discussed in the background section by providing a combined platform for testing fireproof materials for cables.

To this end, the present invention provides a combined platform for testing fireproof materials for cables, comprising:
a main frame for providing operating space;
an air circulation system comprising a fresh air supply unit for supplying fresh air into the operating space and an exhaust gas treatment unit for treating the gas in the operating space under set conditions;
an open flame system for providing an open flame for testing the cables in the operating space;
a water circulation system for supplying water at least to the exhaust gas treatment unit and the operating space for the exhaust gas treatment and spraying of the open flame, respectively; and
a control system for collecting at least the indicator parameters in the operating space, the results of which are used as a basis for the operation of the water circulation system, gas circulation system and open flame system.

Further, the open flame system comprises a gas pipeline and a flame nozzle,
wherein the gas pipeline is laid at the bottom of the operating space to supply gas to the flame nozzle at a set position.

Further, the control system comprises:
a monitoring assembly comprising at least one of a gas sensor, a temperature sensor, a smoke sensor, a thermal imaging device and a visible light monitoring device mounted in the operating space; and
a control module in communicative connection with the monitoring assembly, the water circulation system, the gas circulation system and the open flame system, respectively.

Further, the main frame comprises a refractory layer and a heat insulation layer which are sequentially arranged from the inside to the outside.

Further, the exhaust gas treatment unit comprises a plasma dust removal unit and a spray unit connected to the control system, respectively,
wherein the plasma dust removal unit is arranged inside the spray space of the spray unit, and comprises a gas inlet in communication with the interior of the operating space and a gas outlet in communication with the bottom of the spray unit, and
wherein the spray unit comprises a spray port arranged at top thereof, an gas supply port and an exhaust port, the spray port being in communication with the water circulation system, the gas supply port being in communication with the gas inlet for the gas to enter the plasma dust removal unit, and the exhaust port being used for discharging the gas after spraying.

Further, the plasma dust removal unit comprises two half-shells hinged symmetrically left and right, a ventilation plate, an anode wire and a cathode cylinder;
wherein the two half-shells are surrounded into a three-layer space arranged from top to bottom, among which the gas inlet is disposed in the top-level space, the ventilation plate is installed in the middle-level space to divide a top-level space and a bottom-level space and allows gas circulation from the top-level space to the bottom-level space, the anode wire is installed between the ventilation plate and the bottom of the half-shell and is jacketed inside the cathode cylinder, the cathode cylinder is fixed in the bottom-level space, and the gas outlet is in communication with interior of the cathode cylinder.

Further, the ventilation plate is a cylindrical plate structure and is symmetrically provided with a number of gas passages around a central axis, wherein the gas flow direction of the gas passages is arranged obliquely with respect to the central axis.

Further, the bottom plane of the spray unit is partially recessed inward, a projection is formed inside the spray space, and a mounting cavity is formed inside the projection, the circuitry of the control system runs through the mounting cavity and is then connected to the plasma dust removal unit; wherein the projection is arranged in a sealed fit with the plasma dust removal unit to support the plasma dust removal unit.

Further, at least three gas outlets are symmetrically arranged around the central axis of the cathode cylinder, and are connected with guide tubes allowing the gas to be discharged upwards.

Further, a radial gap is present between the cathode cylinder and the half shell, in which a cold water pipe is spirally wound, wherein a water outlet of the cold water pipe is led from the bottom of the plasma dust removal unit to the spray space, and a water inlet of the cold water pipe is connected to the water circulation system.

With the technical solutions described above, the present invention achieves the following advantageous effects.

In the present invention, through the reasonable configuration of the respective systems, the actual working conditions of scenarios such as fire-resistant cable tunnels and fire-resistant cable trenches can be simulated, and multiple tests such as combustion performance test and physical and chemical performance test can be carried out under various working conditions, so as to realize the testing of fireproof materials for cables and the evaluation of the effectiveness of application scenarios.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

List of reference signs: 1. Main frame; 2. Water circulation system; 3. Air circulation system; 31. Fresh air supply unit; 32. Exhaust gas treatment unit; 33. Plasma dust removal unit; 331. Gas inlet; 332. Gas outlet; 333. Half shell; 334, Ventilation plate; 3341. Gas passage; 335. Anode wire; 336. Cathode cylinder; 337. guide tube; 338. Cold water pipe; 34. Spray unit; 341. Spray port; 342. gas supply port; 343. Exhaust port; 344. Protrusion; 4. Open fire system; 5. Control system.

DETAILED DESCRIPTION

The technical solutions in the embodiments of the present invention will be described clearly and completely in conjunction with the accompanying drawings in the embodiments of the present invention. Obviously, the described embodiments are only a part of the embodiments of the present invention, rather than all the embodiments.

It should be noted that when an element is referred to as being "fixed to" another element, it can be directly on the another element or an intermediate element may also be present. It should be noted that when an element is referred to as being "connected to" another element, it can be directly on the another element or an intermediate element may also be present. The terms "vertical," "horizontal," "left," "right," and similar expressions used herein are for illustrative purposes only and do not mean that they are the only mode of implementation.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

Figure 1:
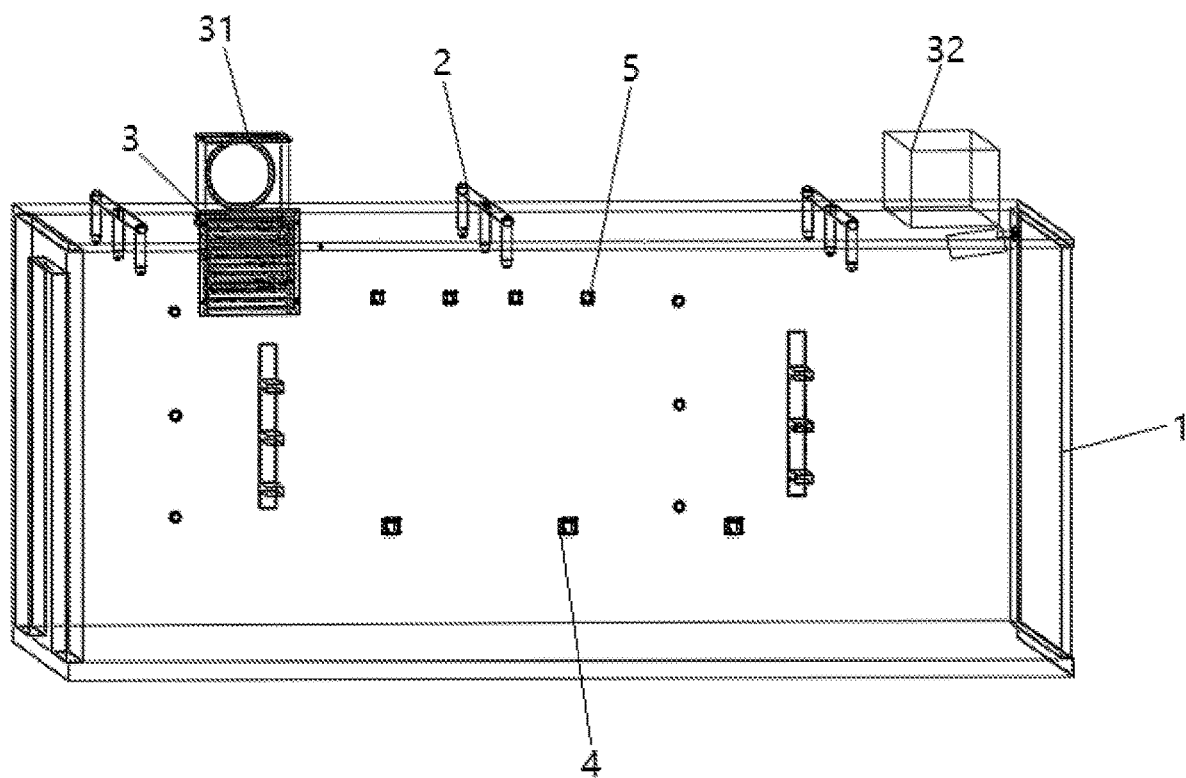
FIG. 1 is a schematic structural diagram of a combined platform for testing fireproof materials for cables.

As shown in FIG. 1, there is provided a combined platform for testing fireproof materials for cables, comprising: a main frame 1 for providing operating space; an air circulation system 3 comprising a fresh air supply unit 31 for supplying fresh air into the operating space and an exhaust gas treatment unit 32 for treating the gas in the operating space under set conditions; an open flame system 4 for providing an open flame for testing the cables in the operating space; a water circulation system 2 for supplying water at least to the exhaust gas treatment unit 32 and the operating space for the exhaust gas treatment and spraying of the open flame, respectively; and a control system 5 for collecting at least the indicator parameters in the operating space, the results of which are used as a basis for the operation of the water circulation system 2, gas circulation system 3 and open flame system 4.

In the present invention, through the reasonable configuration of the main frame 1, water circulation system 2, gas circulation system 3, open flame system 4 and control system 5, the actual working conditions of scenarios such as fire-resistant cable tunnels and fire-resistant cable trenches can be simulated, and multiple tests such as combustion performance test and physical and chemical performance test can be carried out under various working conditions. The combustion performance test module referred to here has the ability to test the performance of small- or medium-scale combustion using at least one or more combustion performance, flame retardant performance testing methods, such as expansion performance, horizontal and vertical combustion, oxygen index, cable fire resistance, cable bundling flame retardancy, etc. The physical and chemical performance test module referred to here has the ability to test the physical and chemical performance of fire protection materials for cables using at least one or more weather resistance, mechanical performance, processing performance testing methods, such as freeze-thaw cycle resistance, bending resistance, viscosity, etc. The specific testing equipment needs to be configured separately in the operating space and will not be detailed in the present application, but the water and electricity supply and ventilation in the testing process can be effectively obtained. The present invention features has a reasonable design and simple structure, which can realize the testing of fireproof materials for cables and the evaluation of the effectiveness of application scenarios, control the quality of materials, clarify the scope of application and application scenarios, and at the same time improve the application of fire prevention materials and reduce the risk of cable and channel fires. For the fixing of the cables, a corresponding fixing structure may be provided in the operating space.

The operating space in the present invention includes is not limited to, the testing space of cables, the space for personnel operation, and the storage space, etc. It can be configured according to actual needs and easily realized by the expansion of the main frame 1. In the present invention, the water source, power supply and gas source in the actual use scenario can be flexibly accessed to achieve combined platform application.

In the implementation, water pipes and lines are laid for the water circulation system 2, gas circulation system 3, open flame system 4 and control system 5 according to the test items and firefighting and cleaning requirements. In application, they are connected with the water and electricity supply interface modules of the platform through the pipeline arrangement. The present invention provides a combined platform for testing fireproof materials for cables, which realizes the performance evaluation of fireproof materials in the cable channel environment, the testing of small- and medium-sized combustion of fireproof materials, and the testing of physical and chemical performance of fireproof materials. The platform consists of multiple functional modules that can be flexibly assembled to realize the combination of multiple types of testing capabilities.

The open flame system 4 comprises a gas pipeline and a flame nozzle, wherein the gas pipeline is laid at the bottom of the operating space to supply gas to the flame nozzle at a set position.

Preferably, the control system 5 comprises: a monitoring assembly comprising at least one of a gas sensor, a temperature sensor, a smoke sensor, a thermal imaging device and a visible light monitoring device mounted in the operating space; and a control module in communicative connection with the monitoring assembly, the water circulation system 2, the gas circulation system 3 and the open flame system 4, respectively.

Through the centralized control module, the respective systems are communicatively connected to realize the remote control of applications such as fire-resistant cable tunnels and fire-resistant cable trenches. Among them, the remote control functions include but are not limited to flame ignition and power control, ventilation control, flue gas treatment control, fire extinguishing start and stop control, lighting control, etc.

The main frame 1 comprises a refractory layer and a heat insulation layer arranged in sequence from the inside to the outside, so that the local refractory temperature of the channel can reach 1250° C., and it can withstand continuous fire for 2 hours. The gas pipes and flame nozzles are pre-buried under the channel to meet the gas supply requirements of the cable fire combustion. In order to ensure the safety, explosion-proof pressure relief port, fire door and observation window can also be provided to ensure application safety.

As a preference of the above-mentioned embodiment, the exhaust treatment unit 32 comprises a plasma dust removal unit 33 and a spray unit 34 connected to the control system 5, respectively, wherein the plasma dust removal unit 33 is arranged inside the spray space of the spray unit 34 and comprises a gas inlet 331 in communication with the interior of the operating space and a gas outlet 332 in communication with the bottom of the spray unit 34, and wherein the spray unit 34 comprises a spray port 341 arranged at top thereof, an gas supply port 342 and an exhaust port 343, the spray port 341 being in communication with the water circulation system 2, the gas supply port 342 being in communication with the gas inlet 331 for the gas to enter the plasma dust removal unit 33, and the exhaust port 343 being used for discharging the gas after spraying.

Figure 2:
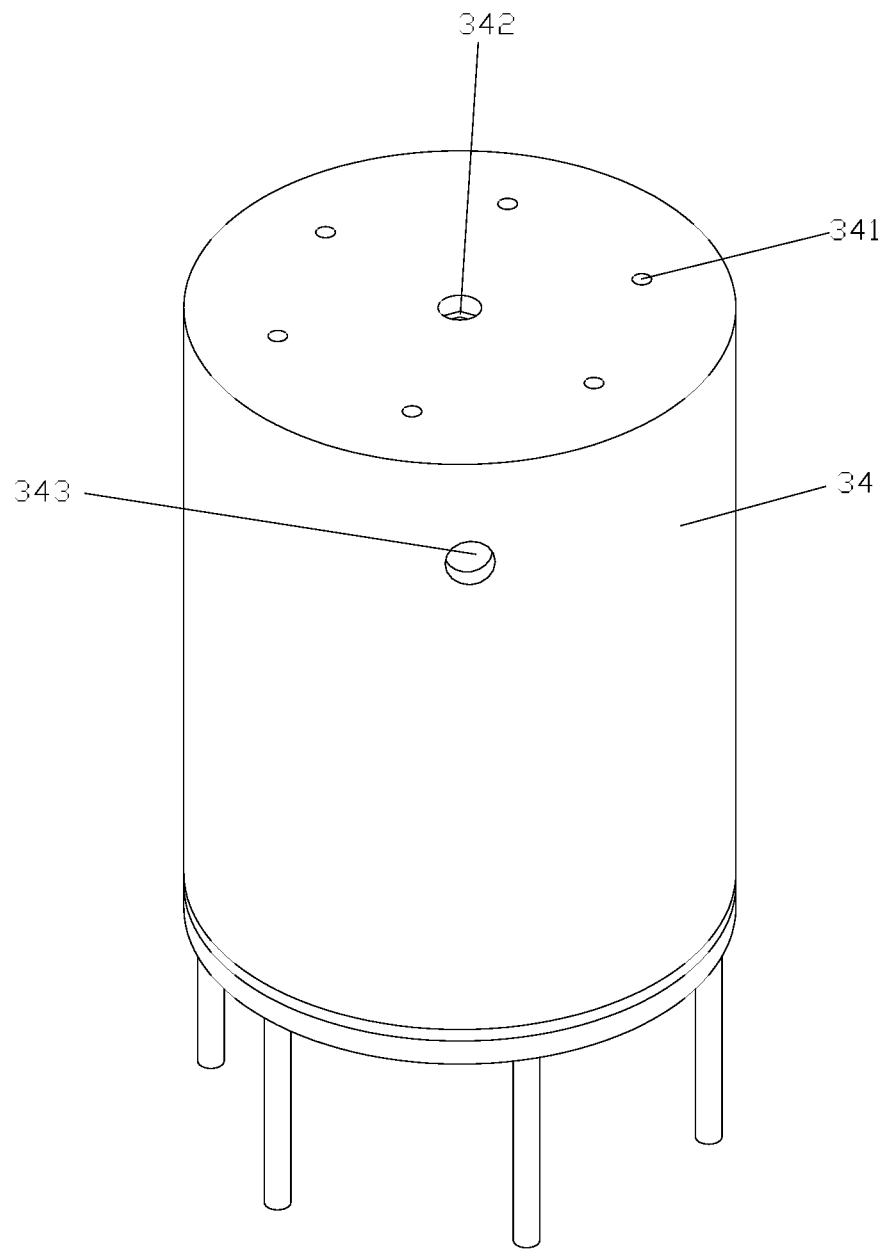
FIG. 2 is a schematic structural diagram outlining the exhaust gas treatment unit.
Figure 3:
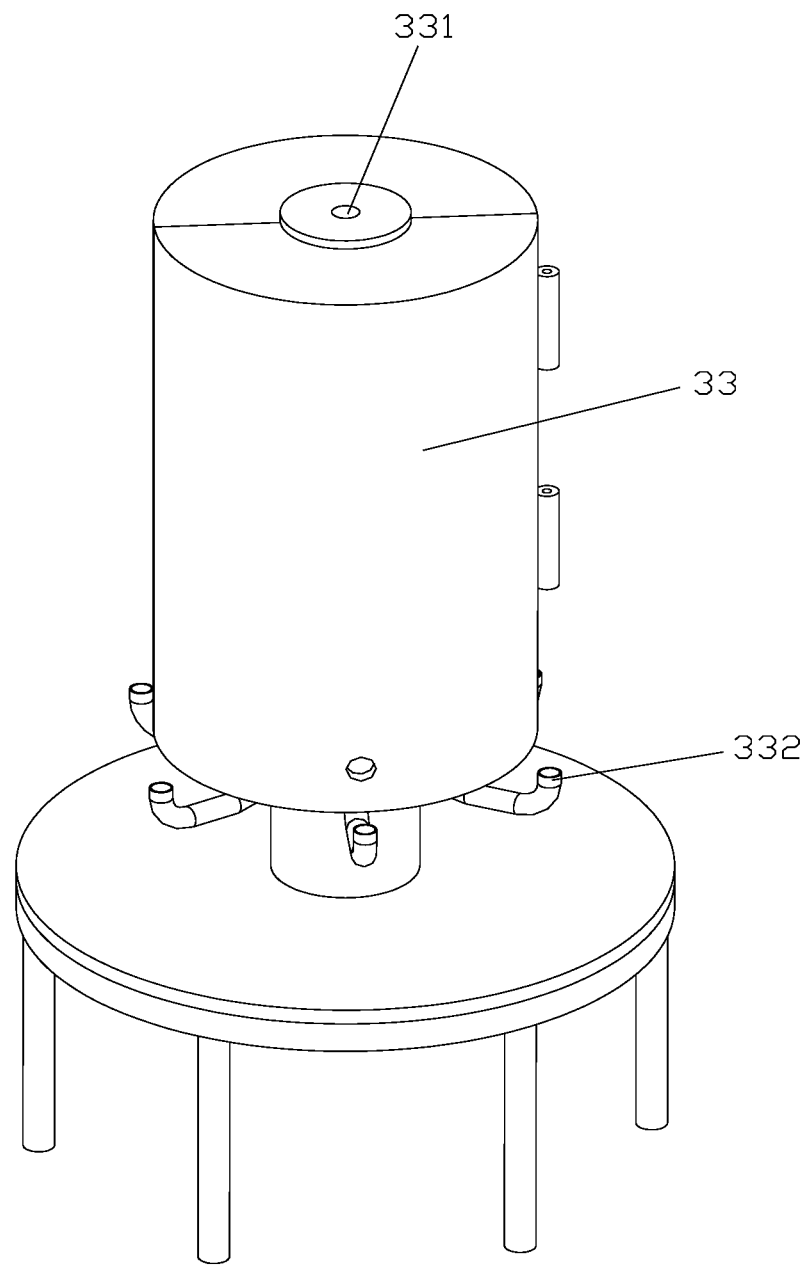
FIG. 3 is a schematic structural diagram of the plasma dust removal unit.

As shown in FIG. 2 and FIG. 3, after the combustion test is completed, the gas to be treated in the operating space is sucked into the plasma dust removal unit 33 through a pump structure, etc. After the dust particles are adsorbed, the gas enters the spray unit 34 from the bottom through the gas outlet 332 and is discharged from the exhaust port 343 after spraying. In this preferred embodiment, by arranging the plasma dust removal unit 33 in the spray space, the first cooling can be achieved while removing dust, and after the dust removal is completed, the second cooling can be achieved by spraying. During the spraying process, weak alkaline water can be used as the washing spraying solution, which can remove the soot and part of the toxic gas generated by the burning of the cables.

Figure 4:
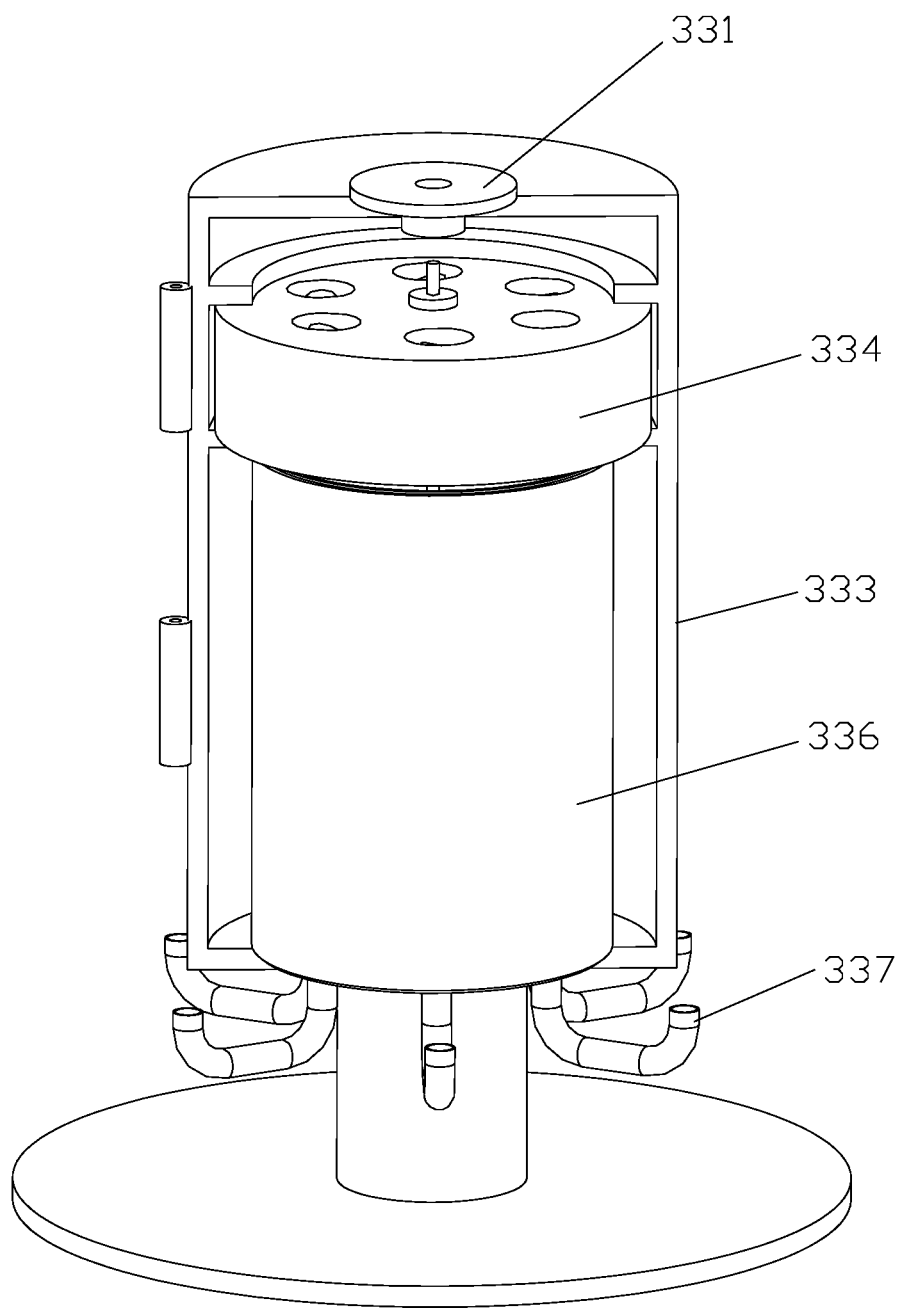
FIG. 4 is a schematic structural diagram after omitting one of the half-shells in FIG. 3.
Figure 5:
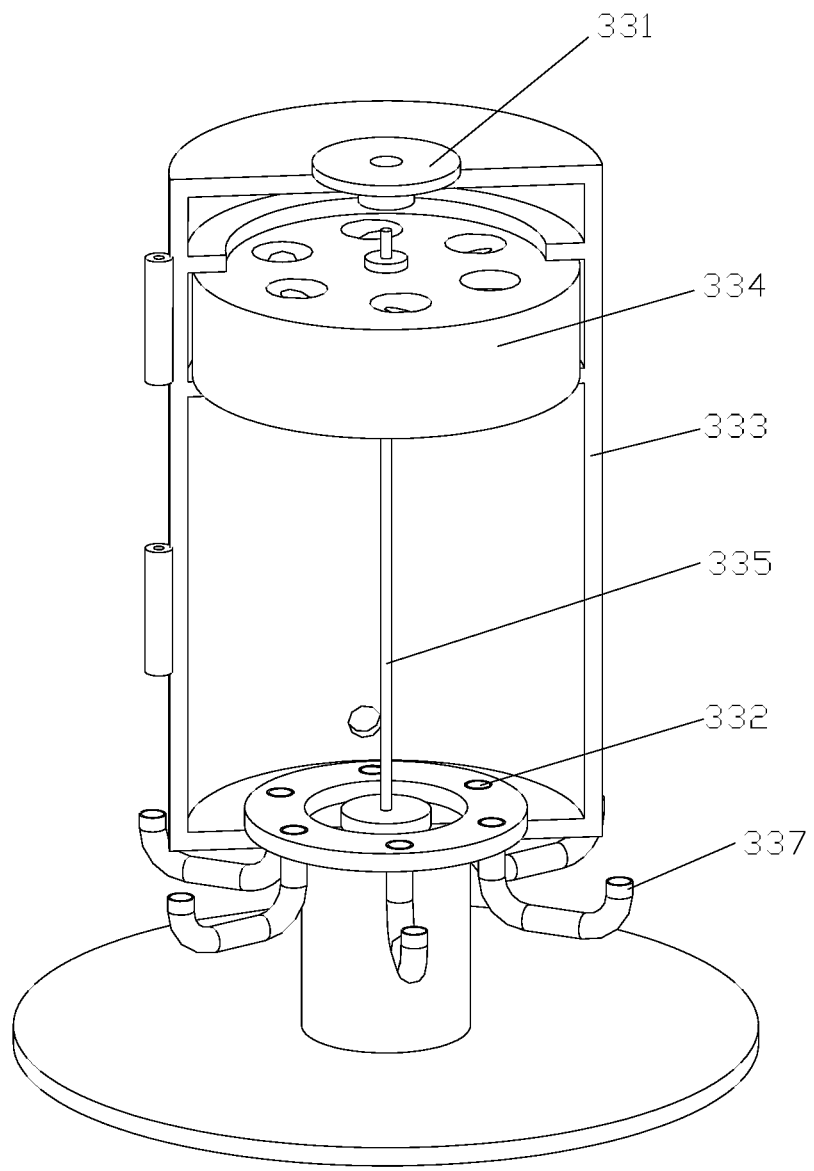
FIG. 5 is a schematic structural diagram after omitting the cathode cylinder in FIG. 4.

As a preference of the above-mentioned embodiment, and as shown in FIG. 4 and FIG. 5, the plasma dust removal unit 33 comprises two half-shells 333 hinged symmetrically left and right, a ventilation plate 334, an anode wire 335 and a cathode cylinder 336, wherein the two half-shells 333 are surrounded into a three-layer space arranged from top to bottom, among which the gas inlet 331 is disposed in the top-level space, the ventilation plate 334 is installed in the middle-level space to divide a top-level space and a bottom-level space and allows gas circulation from the top-level space to the bottom-level space, the anode wire 335 is installed between the ventilation plate 334 and the bottom of the half-shell 333 and is jacketed inside the cathode cylinder 336, the cathode cylinder 336 is fixed in the bottom-level space, and the gas outlet 332 is in communication with interior of the cathode cylinder 336.

The anode wire 335 is connected to a high-voltage DC power supply, and the cathode cylinder 336 is grounded, and after the high-voltage electric field is formed between the two due to the corona discharge generated by the anode, the gas will be corona discharged and will be rapidly ionized. According to the principle of positive and negative phase attraction, the positively charged particles collide with the cathode cylinder 336 under the action of a strong electric field force, and are adsorbed and deposited on the cathode cylinder 336, thereby completing the adsorption.

In this preferred solution, the plasma dust removal unit 33 is a separate module, which can be put into the spraying unit 34 after the overall installation is completed. The control of the gas temperature can be achieved by the overall spraying, and for its part, the quick and easy installation of the internal ventilation plate 334, the anode wire 335 and the cathode cylinder 336 can be achieved by opening the two half-shells 333. The anode wire 335 needs to be replaced regularly, and the cathode cylinder 336 also needs to be cleaned regularly.

The above-mentioned independent and detachable structure enables repetitive implementation of the above-mentioned operations.

Figure 6:
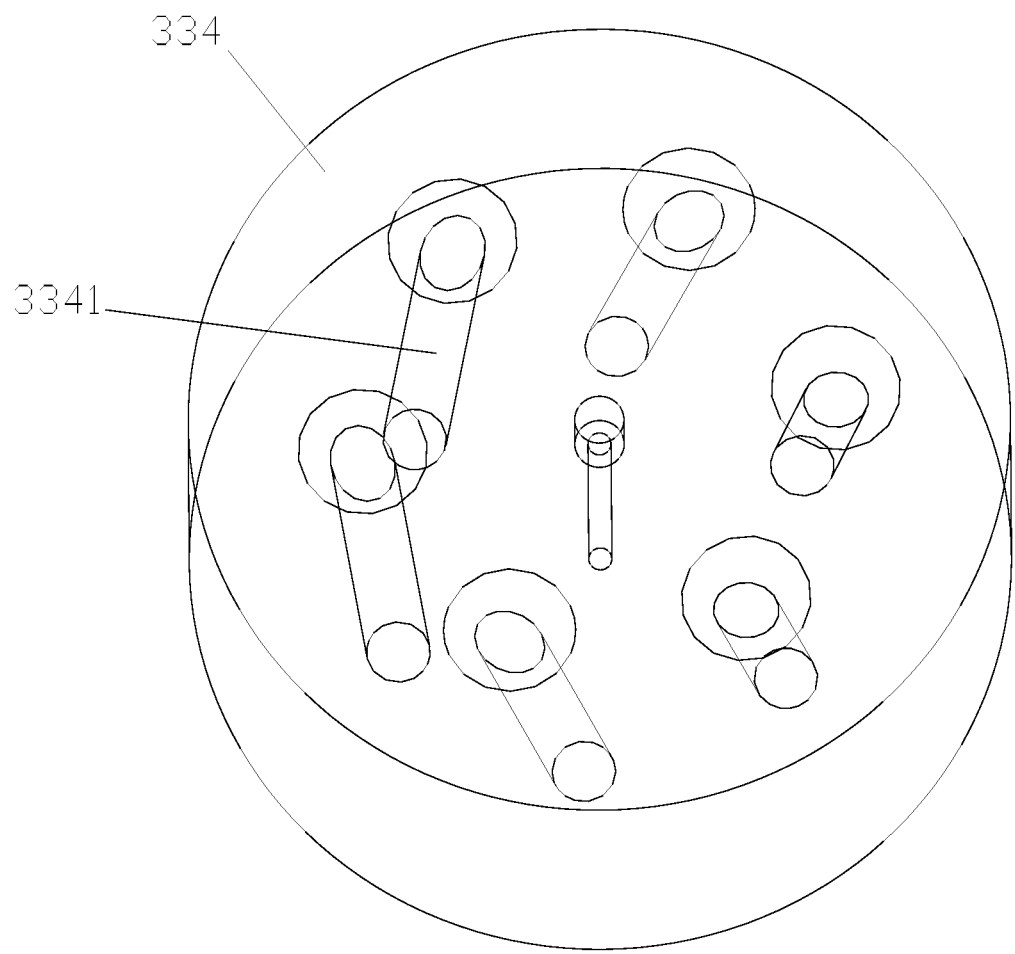
FIG. 6 is a schematic structural diagram of the ventilation plate.

As a preference of the above-mentioned embodiment, and as shown in FIG. 6, the ventilation plate 334 is a cylindrical plate structure and is symmetrically provided with a number of gas passages 3341 around a central axis, wherein the gas flow direction of the gas passages 3341 is arranged obliquely with respect to the central axis. When the number of gas passages 3341 is large enough, a vortex can be formed in the cathode cylinder 336 through multiple airflows, which can increase the circulation time of the gas in the cathode cylinder 336 compared to a straight path, thus increasing the dust removal effect and further improving the heat exchange effect. In order to facilitate the installation of the ventilation plate 334, two upper and lower parallel ridge structures can be arranged on the inner wall of the half-shell 333 between which the ventilation plate 334 can be clamped. A sealing ring can be sleeved around the ventilation plate, so as to achieve sealing with the half shell 333.

Figure 7:
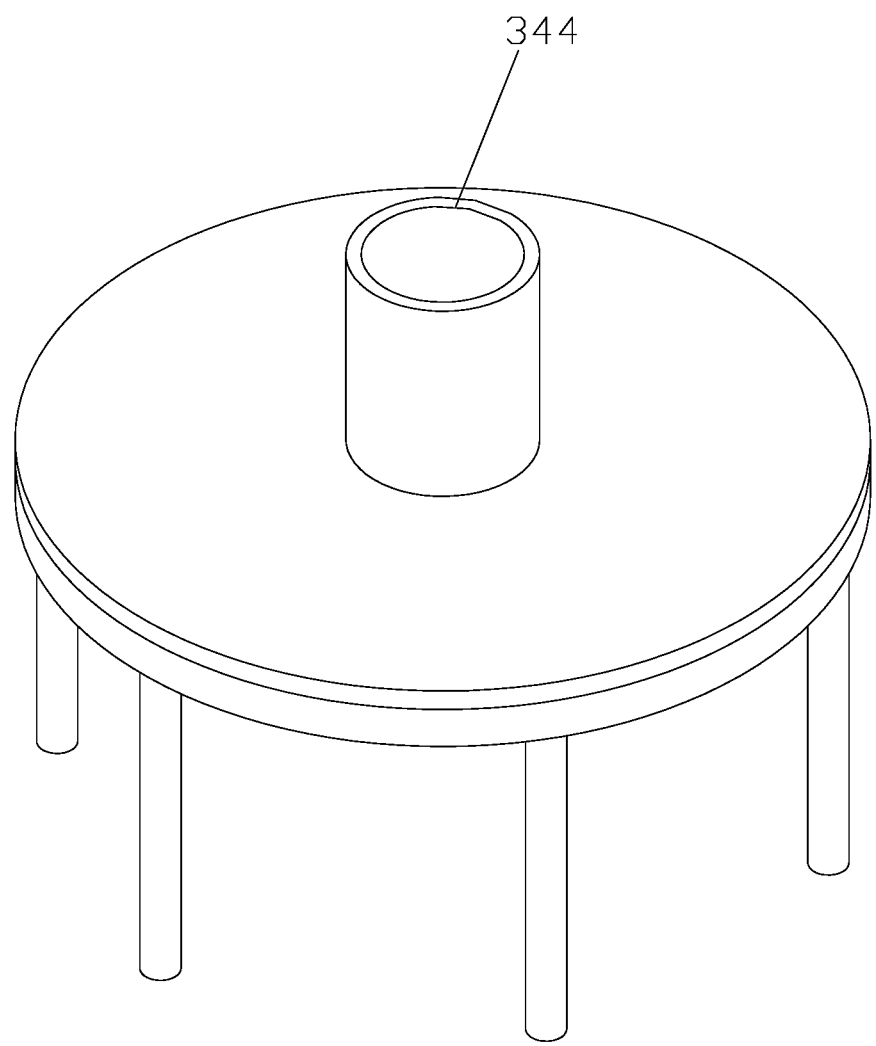
FIG. 7 is a schematic diagram schematic diagram of the position where the protrusion is arranged.

In order to realize the separation of water and electricity, as shown in FIG. 7, the bottom plane of the spray unit 34 is partially recessed inward, a projection 344 is formed inside the spray space, and a mounting cavity is formed inside the projection 344, the circuitry of the control system 5 runs through the mounting cavity and is then connected to the plasma dust removal unit 33, wherein the projection 344 is arranged in a sealed fit with the plasma dust removal unit 33 to support the plasma dust removal unit 33.

A closed independent space relative to the bottom of the spray space is formed by the protrusion 344. There is liquid accumulated after spraying at the bottom of the spray space, and the protrusion 344 effectively blocks the liquid and the circuit structure. By the arrangement of the protrusion, the installation difficulty of the plasma dust removal unit 33 is effectively reduced. By arranging a sealing structure on the protrusion, automatic sealing can be achieved by gravity after the plasma dust removal unit 33 is placed thereon. Since it is elevated relative to the liquid level, the above sealing conditions are sufficient to ensure the blocking effect. The specific connection of the circuit can be performed at the bottom of the spray unit 34 by elevating it, which is reliable in installation and easy to operate.

Figure 8:
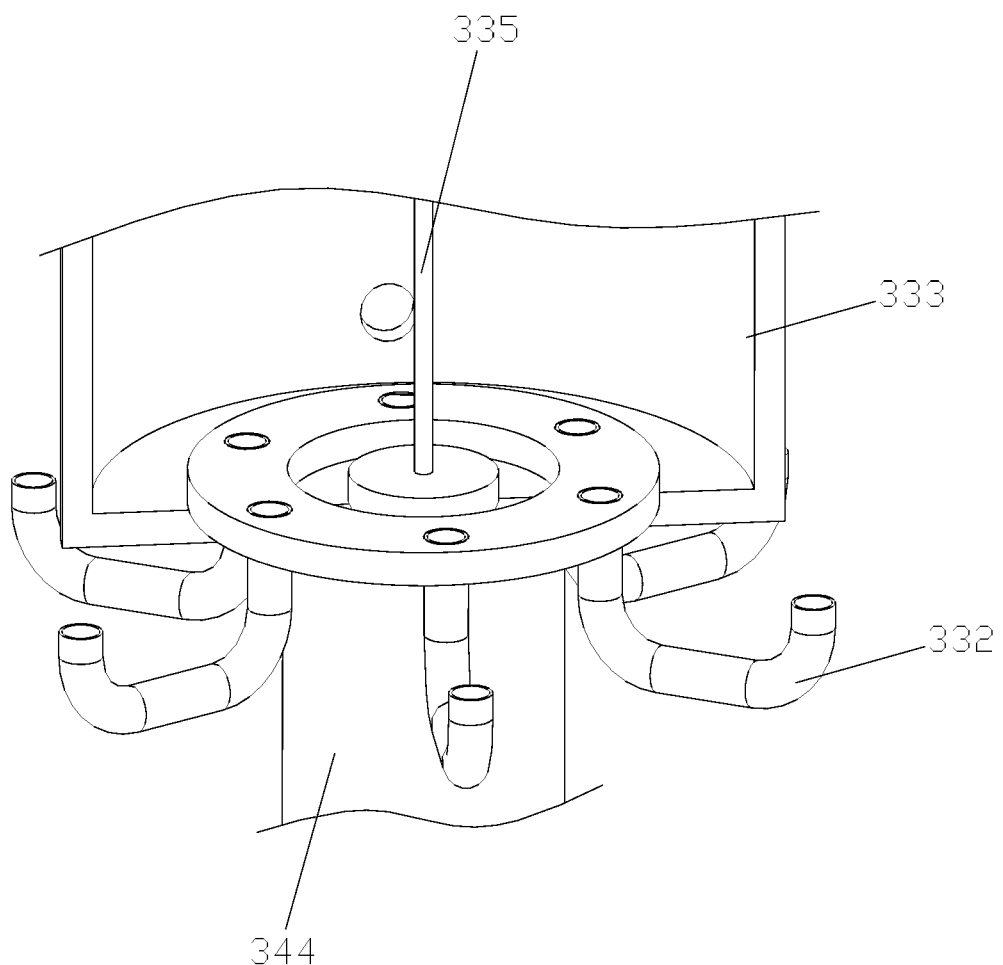
FIG. 8 is a partial enlarged view of the gas outlet in FIG. 5.

In order to improve the spraying effect, as shown in FIG. 8, at least three gas outlets 332 are symmetrically arranged around the central axis of the cathode cylinder 336 and are connected with guide tubes 337 allowing the gas to be discharged upward so as to ensure the uniform discharge of the gas, wherein, preferably, the guide tubes 337 are led out from the bottom of the plasma dust removal unit 33 and then form a straight section after being led out, so that the positioning of the plasma dust removal unit 33 relative to the protrusion 344 is realized by the fit of the respective straight sections and the protrusion 344, thus the position of the plasma dust removal unit 33 is more stable. To ensure the stability of the installation of the guide tube 337, a ring structure may be provided at the bottom of the plasma dust removal unit 33 to strengthen its installation position.

Figure 9:
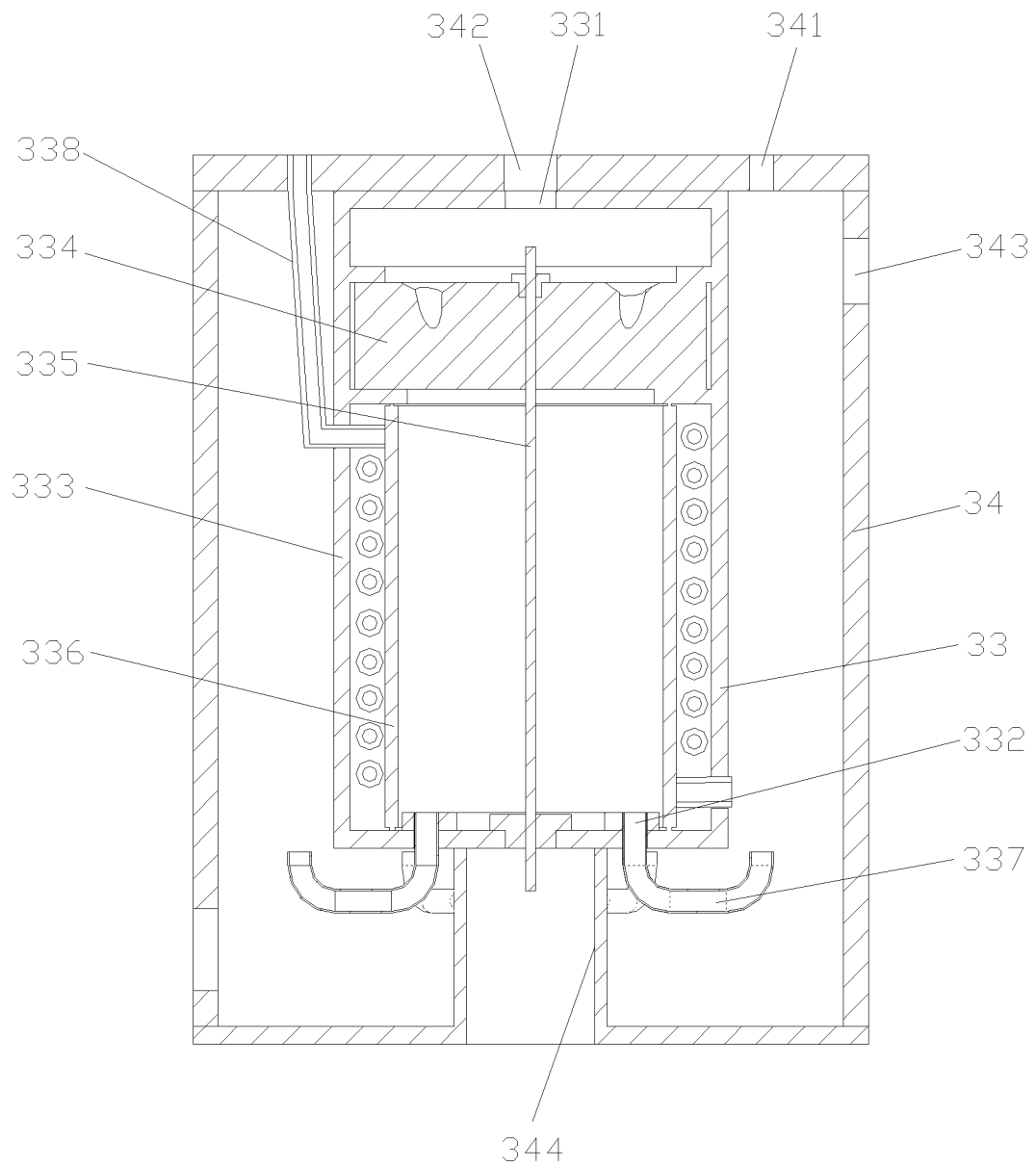
FIG. 9 is a cross-sectional view of an exhaust gas treatment unit.

As a preference of the above embodiment, as shown in FIG. 9, a radial gap is present between the cathode cylinder 336 and the half-shell 333, in which a cold water pipe 338 is spirally wound, wherein a water outlet of the cold water pipe 338 is led from the bottom of the plasma dust removal unit 33 to the spray space, and a water inlet of the cold water pipe 338 is connected to the water circulation system 2. A better cooling effect can be achieved through the circulation of the internal cooling water.

Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A combined platform for testing fireproof materials for cables, characterized in that the combined platform comprises:
   a main frame (1) for providing operating space;
   an air circulation system (3) comprising a fresh air supply unit (31) for supplying fresh air into the operating space and an exhaust gas treatment unit (32) for treating the gas in the operating space under set conditions;
   an open flame system (4) for providing an open flame for testing the cables in the operating space;
   a water circulation system (2) for supplying water at least to the exhaust gas treatment unit (32) and the operating space for the exhaust gas treatment and spraying of the open flame, respectively; and
   a control system (5) for collecting at least indicator parameters in the operating space, the results of which are used as a basis for the operation of the water circulation system (2), the air circulation system (3) and the open flame system (4);
   wherein the exhaust gas treatment unit (32) comprises a plasma dust removal unit (33) and a spray unit (34) connected to the control system (5), respectively,
   wherein the plasma dust removal unit (33) is arranged inside a spray space of the spray unit (34), and comprises a gas inlet (331) in communication with the interior of the operating space and gas outlets (332) in communication with a bottom of the spray unit (34),
   wherein the spray unit (34) comprises a spray port (341) arranged at top thereof, an gas supply port (342) and an exhaust port (343), the spray port (341) being in communication with the water circulation system (2), the gas supply port (342) being in communication with the gas inlet (331) for the gas to enter the plasma dust removal unit (33), and the exhaust port (343) being used for discharging the gas after spraying;
   wherein the plasma dust removal unit (33) comprises two half-shells (333) hinged symmetrically left and right, a ventilation plate (334), an anode wire (335) and a cathode cylinder (336);
   wherein the two half-shells (333) form a three-layer space arranged from top to bottom, the three-layer space includes a top-level space, a middle-level space and a bottom level space, the gas inlet (331) is disposed in the top-level space, the ventilation plate (334) is installed in the middle-level space to divide the top-level space and the bottom-level space and allows air circulation from the top-level space to the bottom-level space, the anode wire (335) is installed between the ventilation plate (334) and a bottom of the two half-shells (333) and is jacketed inside the cathode cylinder (336), the cathode cylinder (336) is fixed in the bottom-level space, and the gas outlets (332) are in communication with interior of the cathode cylinder (336); and
   wherein the ventilation plate (334) is a cylindrical plate structure and is symmetrically provided with a number of gas passages (3341) around a central axis, wherein the gas flow direction of the gas passages (3341) is arranged obliquely with respect to the central axis.

2. The combined platform for testing fireproof materials for cables according to claim 1, characterized in that the open flame system (4) comprises a gas pipeline and a flame nozzle, wherein the gas pipeline is laid at a bottom of the operating space to supply gas to the flame nozzle at a set position.

3. The combined platform for testing fireproof materials for cables according to claim 1, characterized in that the control system (5) comprises:

a monitoring assembly comprising at least one of a gas sensor, a temperature sensor, a smoke sensor, a thermal imaging device and a visible light monitoring device mounted in the operating space; and a control module in communicative connection with the monitoring assembly, the water circulation system (2), the air circulation system (3) and the open flame system (4), respectively.

4. The combined platform for testing fireproof materials for cables according to claim 1, characterized in that the main frame (1) comprises a refractory layer and a heat insulation layer which are sequentially arranged from the inside to the outside.

5. The combined platform for testing fireproof materials for cables according to claim 1, characterized in that the bottom plane of the spray unit (34) is partially recessed inward, a projection (344) is formed inside the spray space of the spray unit (34), and a mounting cavity is formed inside the projection, the circuitry of the control system (5) runs through the mounting cavity and is then connected to the plasma dust removal unit (33); and wherein the projection (344) is arranged in a sealed fit with the plasma dust removal unit (33) to support the plasma dust removal unit (33).

6. The combined platform for testing fireproof materials for cables according to claim 5, characterized in that at least three the gas outlets (332) are symmetrically arranged around the central axis of the cathode cylinder (336), and are connected with guide tubes (337) allowing the gas to be discharged upwards.

7. The combined platform for testing fireproof materials for cables according to claim 6, characterized in that a radial gap is present between the cathode cylinder (336) and the two half-shells (333), in which a cold water pipe (338) is spirally wound, wherein a water outlet of the cold water pipe (338) is led from a bottom of the plasma dust removal unit (33) to the spray space of the spray unit (34), and a water inlet of the cold water pipe (338) is connected to the water circulation system (2).

* * * * *